Patented Dec. 2, 1952

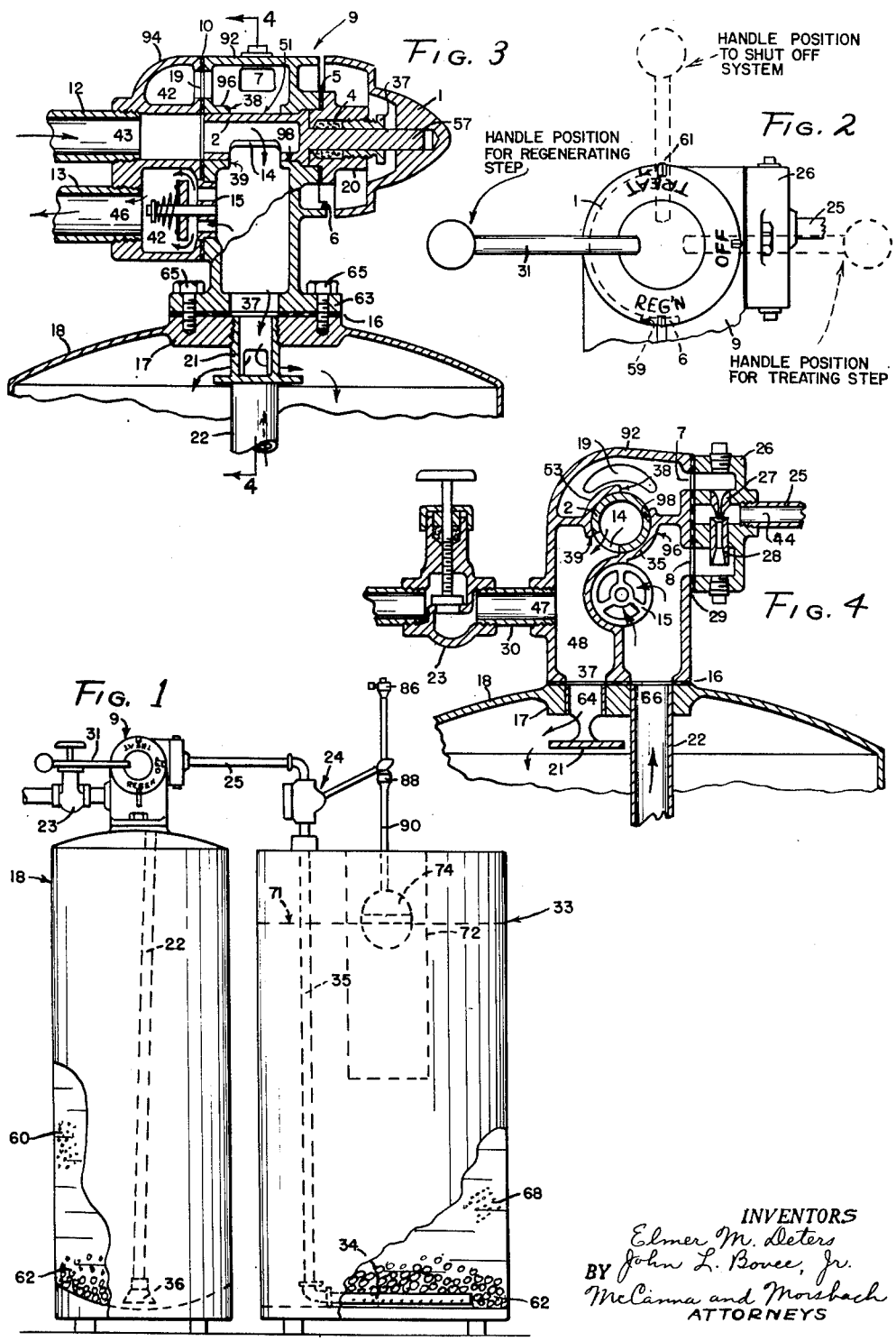

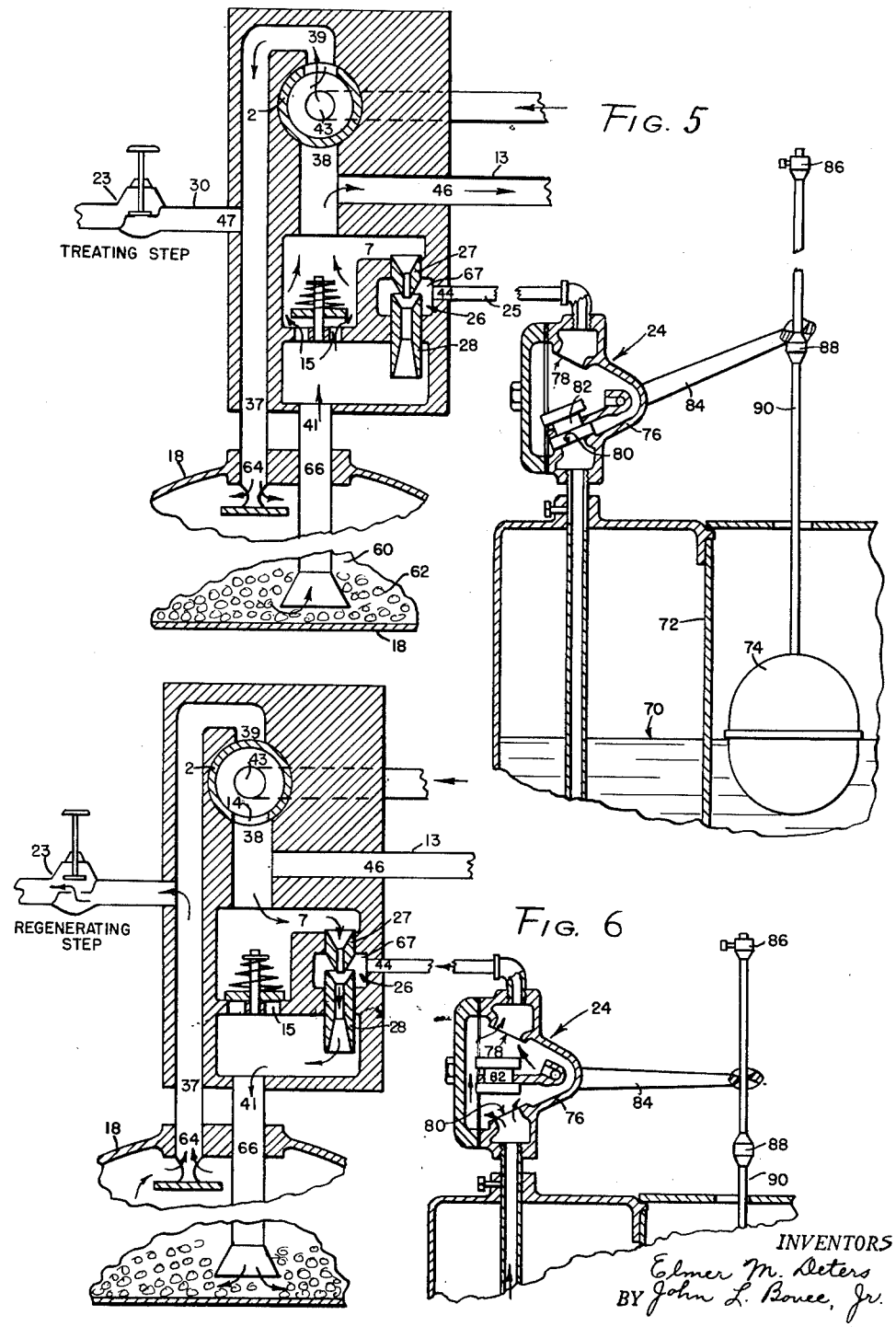

2,620,299

UNITED STATES PATENT OFFICE 2,620,299

WATER TREATMENT APPARATUS AND CONTROL VALVE THEREFOR

Elmer M. Deters, Davenport, Iowa, and John L. Bovee, Jr., Anaheim, Calif., assignors to Red Jacket Manufacturing Co., Davenport, Iowa, a corporation of Iowa Application May 13, 1946, Serial No. 669,346

8 Claims. (Cl. 210—24)

This invention relates generally to an improved water treatment system and a control valve therefor.

Previously, in systems for treating water (for example, in the ordinary household water softening systems having a water treating tank containing a bed of base exchange material such as zeolite, and a regeneration tank containing a regenerating liquid, referred to for convenience herein as "brine") the cycle of operations has included the following steps:

(a) Downflow through the bed to service,
(b) Backwash in an upflow direction at high velocity to lift the bed and wash out the mud, silt and other water-borne particles which were screened out by the filtering action of the bed during the service step,
(c) Downflow at low velocity with brine solution, and
(d) Downflow at high velocity to rinse out the residual brine.

In order to effect the necessary lifting or expansion of the bed to free it of silt, the backwash in these previous systems was necessarily rapid. Conversely, the brine flow was necessarily slow due to the undesirability of wasting it by directing it through the bed faster than it would react with the base exchange material. For this reason, it has been considered impractical to backwash and regenerate simultaneously because it was believed that a backwash rate high enough to free the silt would waste brine, and a rate low enough to use the brine economically would not remove all of the silt.

An important object of this invention therefore is the provision of a water treating apparatus and a novel control valve therefor which eliminates the separate backwashing and regenerating steps and combines them in one step at a flow velocity high enough to remove the silt yet at the same time economically using the brine or other regenerating liquid. In connection with this, a specific object is the provision of parts and proper proportioning and dimensioning of them so that during the backwashing-regenerating step a small percentage of brine is aspirated into the stream of water flowing upward through the treating tank, this exact proportion being determined by the regeneration rate requirement of the particular base exchange material employed.

Another object is the provision of a control valve for a water treating system which is operative between "treating" and "regeneration" positions only and which is extremely simple in construction and inexpensive to manufacture. A corollary object is to provide such a valve in which all the wearing parts are easily examined or replaced.

Other objects and advantages will become apparent from the following description and the accompanying drawings, in which—

Figure 1 shows one form of water treating apparatus embodied in the present invention;

Fig. 2 is an outside view of the control valve portion of the apparatus shown in Figure 1;

Fig. 3 is an enlarged cross-sectional view of the control valve shown in Figures 1 and 2 showing the valve in the treating position with arrows indicating water flowing from a raw water supply port to a service pipe;

Fig. 4 is another cross-sectional view of the valve taken on the line 4—4 of Fig. 3;

Fig. 5 is a view of the water treatment system showing the control valve diagramatically so as to present a better understanding of the arrangement of parts and connecting passageways. Parts are shown in the positions they would assume normally during the service step with arrows indicating water flowing from a raw water supply port to a service pipe, the same as in Figs. 3 and 4; and Fig. 6 is similar to Fig. 5, but shows the arrangement of parts and direction of flow during the regeneration step.

Throughout the figures, like parts are designated by like reference characters.

The complete water treating system shown in Figure 1 will be first briefly described to provide a general background for a subsequent consideration of the components. The water heating tank is generally designated by the numeral 18, the brine tank by 33, the automatic float operated brine valve by 24, the control valve by 9, and the waster or drain valve by 23.

The water treating tank 18 comprises the usual formed shell and contains a bed 60 of relatively light weight base exchange water treating materials. As now found on the market these are of two types, one being known as carbonaceous material and the other as resinous material because of the raw materials from which they are made. It has been found preferable to employ those of the resinous or carbonaceous type for the reason that they have low specific gravities enabling the bed to be lifted on backwash by fairly low rates of flow. This is an advantage in connection with this invention where the backwash and regeneration are carried out simultaneously in the respect that a lower flow rate permits the use of a higher percentage of brine or regenerating liquid without wasting the brine and at the same time is more economical in the use of water. A bed of gravel 62 or the like is contained in the bottoms of both the treating and regenerating tanks so as to more readily diffuse fluid entering at the bottom over the entire cross-section. Normally, during the service or treating part of the cycle, water will enter the treating tank 18 through the inlet 64 formed in the tank flange 17, will pass around the deflector 21, down through the bed 60 into the gravel 62 whence it will enter the fitting 36 and be discharged through the pipe 22 and the outlet 66. While 64 and 66 are designated as inlets and outlets, respectively, this is done for the sake of convenience inasmuch as during the regeneration part of the cycle, brine will enter through the outlet 66 and be discharged through the inlet 64 as will be described later in connection with Fig. 6.

The regenerating or brine tank 33 may have a quantity of undissolved salt 68 with a concentrated brine solution above it, the maximum or upper level of this brine being indicated by the numeral 70 in Fig. 5. A guide tube 72 is provided for the float member 74 in the upper part of the tank.

The automatic regeneration liquid level control valve generally designated 24 is the subject of copending application Serial No. 660,559, filed April 8, 1946, now Patent No. 2,556,872, June 12, 1951, wherein a detailed description of its construction and operation is given. Briefly, it consists of the casing 76 having upper and lower seats 78 and 80 for a double-headed resilient disk member 82 which is movable between the seats by the actuating arm 84, the latter being operable by the float member 74 upon engagement by the upper and lower stops 86 and 88. The automatic operation of the valve 24 may be described as follows: Assume that at the end of the treating step the valve 24 is as shown in Figures 1 and 5 with the float 74 lifted to its maximum position due to the fact that the brine tank is filled. This will cause the disk member 82 to engage the lower seating surface 80. When the control valve 9 and the waste valve 23 are suitably adjusted, as will be later described, to initiate the regeneration step (actually the combined backwash-regeneration-rinsing step), the injector 26 will create a suction within the pipe 25 and draw brine through the level control valve 24 into the regeneration stream, as shown in Fig. 6. The liquid level in the regenerating step will drop toward some minimum, predetermined by the adjustment of the upper stop 86 along the rod 90, and as the level drops the disk member 82 will close off the upper seat 78 thereby shutting off further flow of brine into the regenerating stream. Clear water will flow through the system to rinse the brine out of the treating tank. When the valving is set to initiate the treating step, the pipe 25 will be subjected to pressure instead of suction and water will flow downward through the automatic valve 24 until the maximum liquid level 70 is reached at which time the lower float stop 88 will have moved the disc 82 to close off further communication through the lower seat 80.

The control valve generally designated 9 comprises, in the modification shown in Figs. 3 and 4, a body or housing made up of a front portion 92 and a rear portion 94 with a gasket 10 interposed therebetween and held together by any suitable means, as for instance, bolts (not shown). The front housing portion 92 has a tubular seat portion 96 formed with a bore 98 therewithin and upper and lower seat openings 38 and 39. A tubular plug member 2 having a cylindrical bearing surface 51 is fittedly engaged within the bore 98 in a substantially fluid sealing manner and has an aperture 14 which is adapted to register alternately with the seat openings 38 and 39. By reference to Fig. 4 it will be seen that the tubular portion 96 has the solid bearing portions 53 and 55 of sufficient circumferential dimensions as to overlap the opening 14 when the latter is turned half way between the seat openings 38 and 39. By this construction the plug 2 may be rotated to place the aperture 14 completely out of registration with either of the openings 38 or 39 to allow the hard water supply port 43 to be completely shut off from the rest of the system. Another advantage of this construction, which accrues from splitting the housing along the plane of the gasket 10 at the end of the plug member, is that the latter may be more readily removed from the housing when the valve is disassembled. A flanged packing gland 20 is suitably mounted upon the front housing portion 92 as by bolts (not shown) and a fluid sealing gasket 5 is interposed therebetween. A control knob or dial 1 having the lever handle 31 is attached to the plug extension 57 and adapted to rotate it through the packing screw 3 and packing 4. A frontwardly extending projection 6 formed on the housing portion 92 serves to limit the rotation of the dial 1 at its "treat" and "regenerate" positions by engagement with the shoulders 59 and 61 on the dial.

Considering now the flow passages within the valve 9, the inlet valve seat opening 38 communicates directly with the service port 46 through the housing opening 19 and the passageway 42; and it also communicates with the injector inlet opening 7. Thus, the opening 38 is at all times in communication with the outlet side of the check valve 15 and with the inlet side or nozzle 27 of the injector 26. This is an important part of the present invention and the advantages of it will become apparent in the subsequent description of the operation. The outlet side or Venturi tube 28 of the injector communicates directly with the inlet side of the check valve 15 and with the return portion 41 from the treating tank. The seat opening 39 communicates with the waste port 47 and with the outlet port 37 to the treating tank.

To facilitate the assembly of the control valve 9 upon treating tank 18 the ports 37 and 41 will be associated with a single flange 63 adapted to be mounted as by bolts 65 upon the tank flange 17, a gasket 16 being interposed therebetween to provide the fluid seal. An additional feature of construction providing convenience in disassembling the valve for inspection or repair is that the injector 26 is removably mounted upon the front housing portion 92; but this is not an essential part of the invention for obviously it would function in the manner described if it were made integral therewith.

Operation

Considering now the operation of this improved water treating system and the improved valve 9 associated therewith, refer to Figures 5 and 6 where the valve 9 is diagrammatically shown along with the other parts. During the normal operation, or what usually amounts to the majority of the time, raw water will follow the path indicated by the arrows in Fig. 5, being treated by downflow through the tank 18 and discharged to service through the pipe 13. When the bed of base exchange material 60 requires regenerating, the valve plug 2 will be rotated 180° by the handle 31 till it registers with the seat opening 38 and the waste valve 23 will be opened, both as shown in Fig. 6. Flow during the initial part of the regeneration step will be as indicated by the arrows in Fig. 6 where raw water from the supply port 43 is diverted through the injector nozzle 27 which forces a jet of high velocity fluid into the venturi 28 creating a low pressure or suction in the intermediate chamber 67 which communicates with the regeneration port 44. Regeneration liquid is thus drawn into the stream of water passing through the injector in an amount determined by the capacity of the injector, which capacity will be selected initially based on the regeneration rate of the particular exchange material 60 used. In the case of certain of the above-mentioned resinous base exchange materials, the percentage of brine sent upward through the bed 60, and through the waste valve 23, is preferably in the order of 4% to 5% and at a flow rate of approximately 3 gallons per minute per square foot of bed cross-section. This initial part of the regeneration step is, in reality, a combined backwash for lifting the bed and removing silt and regeneration to effect the desired ion exchange which in previous systems has required two or more separate steps.

As the regeneration step proceeds, the float 74 will drop to its minimum level at which time the valve disk 82 will be seated against the upper seat 78 and no more regeneration liquid will be drawn into the injector. By leaving the plug 2 and the waste valve 23 in their Fig. 6 positions after the seat 78 is closed, flow of clear water will continue upward through the tank 18 and through the waste line 30 to automatically rinse out all residual traces of regeneration liquid.

When the rinsing has proceeded a sufficient length of time the system may be turned to water treating operation by simply rotating the plug 2 back to the original position shown in Fig. 5 and by closing the waste valve 23. Water will again flow in the direction of the arrows shown in Fig. 5, and, in addition, during the initial part of the treating step, water will backflow through the pipe 25 to refill the tank 33 to the maximum level indicated by the numeral 70 whereby the tank is readied for another regenerating step. When the tank 33 is filled and the lower valve seat 80 is closed off by the action of the float, no more back flow will occur through the line 25.

While in the foregoing description there is disclosed a specific preferred embodiment of the present invention, it is to be understood that various changes and modifications which depart from the described form of the invention may be adopted without departing from the spirit and scope of this invention.

We claim:

1. The combination in a water treatment apparatus of a water treatment tank containing a bed of relatively light-weight softener material and having a port in communication with the top of the bed of material and a port in communication with the bottom of the bed of material, a reagent supply tank, a conduit system connected to said tanks including conduits for raw water, treated water, reagent and waste, valve means having two positions of operation, said valve means in one position effecting communication between the raw water conduit and the port in communication with the top of the bed of material to send water down through the tank in a water treating step and out the port in communication with the bottom of the bed of material to the service conduit, said valve means in its other position effecting communication between the port in communication with the bottom of the bed of material to direct the flow of water up through the bed of material and out the port in communication with the top of the bed of material to the waste conduit, said valve means in its second position also effecting communication between the raw water conduit and the service conduit, a check valve disposed between the port in communication with the bottom of the bed of material and the service conduit and an injector connected in parallel with the check valve and having a connection with the reagent conduit, said injector when the valve means is in its other position passing water at a predetermined rate and drawing reagent into the injector for intermixture with the water to form a solution for simultaneously backwashing and regenerating the bed of softener material, and means for terminating the flow of reagent to the injector whereby the continued flow of water through the injector flows to the bottom of the tank for rinsing the bed.

2. In a water treatment apparatus, the combination of a tank containing a bed of base exchange material, a tank containing regenerating liquid, a conduit system connected to said tanks including a conduit for raw water, treated water, reagent and waste, a first conduit in communication with the top of the tank, a second conduit in communication with the bottom of the tank, first valve means connected between the raw water supply and the first conduit, said first valve means in its open position effecting a flow of raw water down through the bed of material out the second conduit to the service conduit, second valve means connected between the raw water supply and the second conduit, said second valve means in its open position effecting the flow of raw water through the second conduit to the bottom of the bed of material and up through the bed and out through the first conduit to the waste conduit, manual means for simultaneously moving said valve means between preselected positions, in one position said first valve means being open and the second valve means being closed and in the other position said first valve means being closed and said second valve means being open, a check valve disposed between the second valve means and the second conduit positioned to pass liquid flowing from the second conduit to the service conduit, an injector connected in parallel with the check valve and operable with liquid flowing from the second valve means to the second conduit, said injector having a connection with the reagent conduit for drawing reagent from the reagent tank for intermixture with the liquid flowing through the injector to provide a flow of liquid in the second conduit to backwash and regenerate the bed, and means for terminating the flow of reagent after a preselected quantity thereof has been withdrawn from the reagent tank.

3. In a water treatment apparatus, the combination of a tank containing a bed of base exchange material, a tank containing a reagent for regenerating said material, a conduit system connected to said tanks including a conduit for raw water, treated water, reagent and waste, a first conduit in communication with the top of the bed of material in the tank, a second conduit in communication with the bottom of the bed of material, first valve means connected between the raw water supply and the first conduit, said first valve means in its open position effecting a flow of raw water down through the bed of material and out the second conduit to the service conduit, second valve means connected between the raw water supply and the second conduit, said second valve means in its open position effecting the flow of raw water through the second conduit to the bottom of the bed of material, up through the bed of material and out through the first conduit to the waste conduit, a check valve disposed between the second valve means and the second conduit positioned to pass liquid flowing from the second conduit, an injector connected in parallel with the check valve and positioned to be operable with raw water flowing from the second valve means to the second conduit, said injector having a connection with the reagent conduit to draw reagent from the reagent tank for intermixture with the liquid flowing through the injector to provide a flow of liquid to the bottom of the tank through the second conduit to backwash and regenerate the bed, and means for terminating the flow of reagent after a preselected quantity thereof has been withdrawn from the reagent tank for continued flow of raw water through the second conduit to rinse the bed.

4. A control unit for a water treating apparatus comprising a body having a raw water supply port, inlet and outlet ports for connection to the inlet and outlet ports respectively of a water treating tank, a port for connection to a regeneration reagent supply, a port for connection to a service line and a port for connection to a waste conduit, a valve disposed in said body comprising a cylindrical bore having spaced openings in the walls thereof, one of said openings being in communication with the inlet port and with the waste port, and the other of said openings being in communication with the service port and with the outlet port, and a cylindrical sleeve disposed in said bore and rotatable between preselected positions, said sleeve having a passageway in communication with the raw water supply port and having an aperture in communication with said passageway shaped to register with one of said openings in each of the positions of the sleeve, a check valve disposed between said other opening and said outlet port and positioned to pass liquid flowing from said outlet port to said service port and an injector disposed between said other opening and said outlet port and having a connection with said reagent port to draw a reagent through said port for intermixture with water flowing through said injector to the outlet port.

5. A control unit for a water treating apparatus comprising a body formed by separable parts, said body having a raw water supply port, inlet and outlet ports for connection to the inlet and outlet ports respectively of a water treating tank, a port for connection to a regeneration reagent supply, a port for connection to a service line and a port for connection to a waste conduit, a valve disposed in said body comprising a cylindrical bore having spaced openings in the wall thereof, one of said openings being in communication with the inlet port and with the waste port and the other of said openings being in communication with the service port and with the outlet port, a cylindrical sleeve disposed in said bore and rotatable between preselected positions, the inner end of said sleeve lying substantially in the line of separation between the separable parts to provide access to the sleeve when the parts are disassembled for withdrawal axially from the bore, said sleeve having a central opening in communication at an end of the sleeve with the raw water supply port and having an aperture on its annular surface in communication with said passageway shaped to register with one of said openings in each of the positions of the sleeve, said sleeve in an intermediate position preventing the flow of water through the control unit, a check valve disposed between said other opening and said outlet port positioned to pass liquid flowing from said outlet port to said service port and an injector disposed between said other opening and said outlet port and having a connection with said reagent port to draw reagent through said port for intermixture with water flowing through said injector to the outlet port.

6. A control unit for a water treating system comprising a body shaped to be mounted directly on a softener tank and having a raw water supply port, inlet and outlet ports for connection to the top and bottom respectively of a bed of softener material, a regeneration liquid port, a service port and a waste port, said body having a first passageway effecting communication between said supply port and said waste port and said inlet port and a second passageway between said supply port, the service port and the outlet port, first valve means in said first passageway for controlling the flow of liquid therethrough, second valve means in said second passageway for controlling the flow of liquid therethrough, check valve disposed in said second passageway for passing liquid flowing from said outlet port to the service port and an injector disposed in said second passageway in parallel with said check valve and operable with liquid flowing from the raw water supply port to said outlet port, said injector being in communication with said reagent supply port and operable upon the passage of liquid through the injector to draw reagent into the second passageway for intermixture with the water flowing to the outlet port.

7. A control unit for a water treating system comprising a body having a raw water supply port, inlet and outlet ports for connection to the top and bottom respectively of a bed of softener material, a regeneration liquid port, a service port and a waste port, said body having a first passageway effecting communication between said supply port and said waste port and said inlet port and a second passageway between said supply port, the service port and the outlet port, first valve means in said first passageway for controlling the flow of liquid therethrough, second valve means in said second passageway for controlling the flow of liquid therethrough, manual means for simultaneously moving said valve means between preselected positions, in one position said first valve means being open and the second valve means being closed and in the other position said first valve means being closed and said second valve means being open, a check valve disposed in said second passageway for passing liquid flowing from said outlet port to the service port and an injector disposed in said second passageway in parallel with said check valve and operable with liquid flowing from the raw water supply port to said outlet port, said injector being in communication with said reagent supply port and operable upon the passage of liquid through the injector to draw reagent into the second passageway for intermixture with the water.

8. In an apparatus for water treatment, in combination, a water treatment tank containing water treatment material and provided with a port in communication with the top of the tank and a port in communication with the bottom of the tank, a reagent supply tank, a conduit system connected to said tanks including conduits for raw water, treated water, reagent, and waste, valve means controlling the communication between said raw water conduit and the respective top and bottom ports of the water treatment tank, said valve means in one position effecting communication between the raw water conduit and the top port for the water treatment step, said valve means in another position effecting communication between the raw water conduit and the bottom port for the back-wash step, and a check valve and an injector each connected between said bottom port and the treated water conduit, said check valve opening responsive to water flow during the treating step to pass treated water from said bottom port to the treated water conduit, said check valve and said injector each being connected between the said bottom port and the raw water conduit during the back-wash step, said check valve being closed during the back-wash step, said injector communicating with the reagent conduit for drawing reagent into the water stream passing from the raw water conduit through the injector and thence to the bottom port during the back-wash step.

ELMER M. DETERS.
JOHN L. BOVEE, Jr.

REFERENCES CITED

The following references are of record in the file of this patent:

UNITED STATES PATENTS

| Number | Name | Date |
|---|---|---|
| 1,685,816 | Kenney | Oct. 2, 1928 |
| 1,751,061 | Ter Beest | Mar. 18, 1930 |
| 1,764,155 | Daniels | June 17, 1930 |
| 1,851,927 | McCord | Mar. 29, 1932 |
| 1,889,231 | Wahlbom | Nov. 29, 1932 |
| 1,911,412 | Wagner | May 30, 1933 |
| 1,937,324 | Pick | Nov. 28, 1933 |
| 1,962,663 | McGill | June 12, 1934 |
| 1,987,854 | Humphrey | Jan. 15, 1935 |
| 2,110,758 | Daniels | Mar. 8, 1938 |
| 2,137,406 | Johnson | Nov. 22, 1938 |
| 2,304,109 | McGill | Dec. 8, 1942 |
| 2,407,538 | Daniels | Sept. 10, 1946 |